United States Patent
Riedel

(10) Patent No.: US 10,906,575 B2
(45) Date of Patent: Feb. 2, 2021

(54) COLLAPSIBLE STEERING WHEEL

(71) Applicant: Brose Fahrzeugteile GmbH & Co. Kommanditgesellschaft, Coburg, Coburg (DE)

(72) Inventor: Roland Riedel, Berlin (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 16/619,547

(22) PCT Filed: May 11, 2018

(86) PCT No.: PCT/EP2018/062205
§ 371 (c)(1),
(2) Date: Dec. 5, 2019

(87) PCT Pub. No.: WO2018/224238
PCT Pub. Date: Dec. 13, 2018

(65) Prior Publication Data
US 2020/0122767 A1  Apr. 23, 2020

(30) Foreign Application Priority Data

Jun. 6, 2017 (DE) .................. 10 2017 209 499

(51) Int. Cl.
*B62D 1/06* (2006.01)
*B62D 1/18* (2006.01)
*B62D 1/183* (2006.01)

(52) U.S. Cl.
CPC .............. *B62D 1/06* (2013.01); *B62D 1/183* (2013.01)

(58) Field of Classification Search
CPC ... B62D 1/04; B62D 1/06; B62D 1/10; B62D 1/11; B62D 1/183
See application file for complete search history.

(56) References Cited

U.S. PATENT DOCUMENTS

| | | | |
|---|---|---|---|
| 3,274,851 A * | 9/1966 | Geller .................. | B62D 1/04 74/552 |
| 7,610,830 B2 * | 11/2009 | Serrano Gil .......... | B63H 25/02 114/160 |
| 10,501,108 B2 * | 12/2019 | Beauregard ........... | B62D 1/06 |
| 10,532,760 B1 * | 1/2020 | Wang ..................... | B62D 1/04 |

(Continued)

FOREIGN PATENT DOCUMENTS

| DE | 102005044289 A1 | 3/2007 |
|---|---|---|
| DE | 102006006995 A1 | 8/2007 |

(Continued)

OTHER PUBLICATIONS

Machine translation of FR 1132805 A obtained on Mar. 5, 2020.*

*Primary Examiner* — Adam D Rogers
(74) *Attorney, Agent, or Firm* — Brooks Kushman, P.C.

(57) ABSTRACT

A collapsible steering wheel of a motor vehicle, comprising a steering wheel rim having a number of segments that can be moved in relation to each other between a first position and a second position. A first angle is formed between respectively adjacent segments in the first position and a second angle different from the first angle is formed between respectively adjacent segments in the second position. The disclosure also relates to a steering device of a motor vehicle.

18 Claims, 4 Drawing Sheets

(56) References Cited

U.S. PATENT DOCUMENTS

| | | | |
|---|---|---|---|
| 10,562,558 B1 * | 2/2020 | Spahn | ........................ B62D 1/10 |
| 10,569,799 B2 * | 2/2020 | Kim | ........................ B62D 1/185 |

FOREIGN PATENT DOCUMENTS

| | | | | |
|---|---|---|---|---|
| DE | 102008045918 A1 | | 5/2009 | |
| DE | 102010055589 A1 * | | 6/2012 | ............... B62D 1/06 |
| DE | 102017203223 A1 * | | 8/2018 | ............... B60D 1/04 |
| EP | 2554454 A1 | | 2/2013 | |
| FR | 1132805 A * | | 3/1957 | ............ B60R 21/05 |
| FR | 2779695 A1 | | 12/1999 | |
| FR | 2990674 A1 * | | 11/2013 | ............... B62D 1/11 |
| FR | 3067317 A1 * | | 12/2018 | ............... B60N 2/00 |
| KR | 20050048097 A * | | 5/2005 | |
| WO | 2017060149 A1 | | 4/2017 | |
| WO | WO-2019137875 A1 * | | 7/2019 | ............... B62D 1/04 |

\* cited by examiner

COLLAPSIBLE STEERING WHEEL

CROSS-REFERENCE TO RELATED APPLICATIONS

This application is the U.S. National Phase of PCT/EP2018/062205 filed May 11, 2018, which claims priority to DE 10 2017 209 499.0 filed Jun. 6, 2017, the disclosures of which are hereby incorporated in their entirety by reference herein.

TECHNICAL FIELD

The present disclosure relates to a collapsible steering wheel of a motor vehicle, and a steering device of a motor vehicle with a collapsible steering wheel.

BACKGROUND

Motor vehicles usually have front wheels by means of which a desired direction of the motor vehicle is set. For this, the front wheels are usually coupled by means of a steering rod to which the steering wheel is connected. Using the steering wheel, the driver of the motor vehicle sets the desired direction. For this, the steering wheel is rotated so that the front wheels point in the desired direction. The steering wheel itself is usually positioned in front of the driver of the motor vehicle at chest height, so that he can grip the steering wheel comparatively easily. Because of this, the driver's freedom of movement is restricted, so that he cannot turn to the side or can only do so with comparative difficulty while in the seat. Also, entry to and exit from the motor vehicle are obstructed. In comparatively compact passenger compartments, such as for example in racing vehicles, it is therefore known to design the steering wheel so as to be removable, so that it can be removed before entry. After the driver has positioned himself in the vehicle seat, the steering wheel is refitted so that the driver can steer the vehicle. When the steering wheel is fitted, exit from the motor vehicle is not possible or only with comparative difficulty.

Motor vehicles are becoming increasingly automated so they can be moved autonomously. Here we distinguish between various automation stages. Above so-called Level 3, which is a high degree of automation, it is not necessary for the driver to permanently monitor the individual systems which serve to control the motor vehicle. Accordingly, the driver can deal with other matters, wherein however intervention in the controls is possible or sometimes necessary. When the motor vehicle is travelling in Level 3, it is not necessary for the driver to operate the steering wheel. Therefore, at least for certain periods of time, the driver does not need the steering wheel. Since, however, this must nonetheless necessarily be present, space and hence comfort for the driver are reduced.

SUMMARY

The present disclosure may provide a particularly suitable steering wheel of a motor vehicle, and a particularly suitable steering device of a motor vehicle, that may reduce space required and/or increase comfort for a user.

The steering wheel is part of a motor vehicle, such as a car or a truck. Using the steering wheel, during operation, a direction in which the motor vehicle travels is set. The steering wheel is in particular suitable, provided and configured for this. In other words, the steering wheel serves for the controlled movement of the motor vehicle and in particular for selection and/or setting of a direction of travel. The steering wheel is designed so as to be foldable. In other words, it is possible to fold up the steering wheel at least partially. In other words, it is a collapsible steering wheel. The steering wheel itself may include a steering wheel rim having a number of segments. Thus the steering wheel rim may include at least two segments. For example, the segments may have an arcuate form or shape.

The segments may be moved relative to each other between a first position and a second position. Here, in the first position, a first angle is formed between respective adjacent segments. In the second position, a second angle, different from the first angle, is formed between the respective adjacent segments. For example, the first angle is the same for all segments, and/or the second angle is the same for all segments. Alternatively, in the first position, the first angle is formed between respective adjacent segments, wherein the first angles differ from each other. Alternatively or in combination with this, the second angles differ from each other. The adjacent segments lie for example against each other in the first and/or second positions, or have at least a comparatively small spacing. In particular, the two segments which have the smallest spacing of all segments are adjacent to each other.

To summarize, it is possible to change the position of the segments relative to each other so that in the first position, the steering wheel rim has a shape which differs from the shape of the steering wheel rim in the second position. Here, the position of the segments relative to each other is changed, i.e. the position of a first segment relative to a second, which in particular is independent of a rotation of the steering wheel for setting the direction of travel. In particular, on rotation of the steering wheel for setting the direction of travel, the relative position of the segments to each other is not changed. In other words, setting the desired direction suitably takes place by rotation of the steering wheel, wherein the relative position of the segments to each other remains the same.

For example, the segments can be transferred only between the first position and the second position. In particular, it is possible to lock the segments in the first position and/or the second position. Alternatively, further positions are formed, for example between the first position and the second position, wherein the positions therefore constitute transitional positions. For example, the transitional positions are formed continuously or in stages between the first position and the second position.

Because of the two positions, it is possible to adapt the steering wheel rim to current requirements, wherein for example in the first position, it is comparatively easy to set or at least be able to set the direction of the motor vehicle. Suitably, in the second position, the space required for the steering wheel is reduced, which increases the comfort for a user, in particular for the driver of the motor vehicle. For example, in the second position it is not possible to set or select a desired direction of travel for the motor vehicle using the steering wheel, and this facility is suitably blocked.

For example, each segment is made of one piece. Suitably, the segments are identical to each other. In particular, each of the segments may include a core which is for example made of a metal. This is suitably surrounded by foam which preferably is sheathed in a plastic or leather or similar material. This improves the haptic feel for the user. The segments serve in particular to be gripped by the user so that, in the correct usage state, the user grips the segments or at least one of the segments for at least part of the time.

As one example, in the first position, the segments are arranged substantially in a plane. In other words, the first angle is substantially equal to 180°. Suitably, in the first position, the segments form a ring shape, wherein the ring shape is designed for example to be circular or polygonal, for example rectangular or pentagonal. Suitably, the corners are designed to be rounded, which leads to an improved haptic feel for the user. To set the direction, suitably the steering wheel is rotated substantially about an axis which is perpendicular to the plane.

In the second position, at least one of the segments, or two of the segments and/or all of the segments, enclose a third angle with the plane. In other words, the segments point out of the plane. The third angle is for example equal to the difference between 90° and the second angle. In particular, the vertex of the third and/or second angle lies within the plane. In particular, in the second position, the extension of the steering wheel rim within the plane is smaller and the segments are suitably moved such that, as one example, a maximal extension within the plane is reduced in comparison with the first position. In this way, the space required for the collapsible steering wheel is further reduced, which further increases comfort for the user.

Suitably, the collapsible steering wheel may include a first hub. In particular, in mounted state the first hub is attached to a steering column, e.g. rotationally fixedly. The first hub may be provided and configured for this. The first hub may be suitably surrounded by the segments, such as around the circumference relative to a straight line which is suitably perpendicular to the plane (where present). In particular, the straight line is parallel to an extension of a steering column. The segments are attached to the first hub, for example fixed or mounted in articulated fashion. By rotation of the segments therefore, suitably the first hub is rotated so that a desired steering movement is transmitted. Furthermore, the segments are stabilized by means of the first hub. Here, suitably, in the first position and/or in the second position, the segments are rotationally symmetrical relative to an axis of symmetry. The symmetry angle advantageously corresponds to the fraction of 360° and the number of segments, or to an integral multiple of the number segments. In particular, the axis of symmetry is perpendicular to the plane and/or parallel to the axis about which the collapsible steering wheel is rotated in order to set the direction during operation.

Suitably, the collapsible steering wheel has a number of spokes corresponding to the number of segments. In one or more embodiments, the number of segments is equal to the number of spokes. The spokes themselves are mounted on the first hub in articulated fashion, and in particular each segment is mounted on one of the spokes in articulated fashion. In other words, respective joints are arranged between the first hub and the spokes, and between the spokes and the segments. Thus at least one of the segments may be assigned to each of the spokes. To summarize, for example each of the spokes is mounted at the end in articulated fashion on the first hub. Alternatively or in combination with this, each of the spokes is mounted at the end in articulated fashion on at least one of the segments. Because of the articulation, it is possible to set an angle formed between the first hub and the respective spoke. Furthermore, it is possible to set an angle between each segment and the respective assigned spoke.

In one or more embodiments, a free end of each segment is mounted on the respective spoke in articulated fashion. For example, the joint is attached at the free end, or the joint is integral with the respective free end and/or segment. Suitably, each segment is mounted on both sides on a respective one of the spokes in articulated fashion, so that at least two of the spokes are assigned to each segment. Here suitably, also two different segments may be assigned to each spoke. Suitably, the articulation takes place at the end on the respective spoke, so that each end of each segment is mounted in articulated fashion on one of the spokes. By means of the joints, it is possible to set the first and second angles between the adjacent segments. By means of the spokes, the segments are stabilized relative to the first hub and hence to each other. At least the position of the segments is predefined, in particular within a specific framework. Accordingly, a comparatively robust collapsible steering wheel is provided, wherein production costs are comparatively low. The spokes are suitably designed to be substantially cuboid and extend in particular substantially only one direction. For example, the spokes are produced by means of rods or similar, wherein for example each of the spokes has an opening or similar. In particular, the spokes are made of a metal such as for example a steel or aluminum.

Suitably, the collapsible steering wheel has a second hub which is movable relative to the first hub in a longitudinal direction. The longitudinal direction is suitably perpendicular to the plane concerned, and for example parallel to the axis about which the collapsible steering wheel is rotated in order to set the direction of the motor vehicle during operation. Suitably, the second hub is congruent with the first hub, or the second hub covers the first hub. Alternatively, the first hub covers the second hub. In this way, a comparatively compact collapsible steering wheel is provided. In correct usage state, suitably the second hub is offset relative to the first hub in the direction of the user of the motor vehicle, in particular the driver of the motor vehicle, and the first hub may be attached to the steering column.

Suitably, the second hub may be mounted on the spokes in articulated fashion by means of auxiliary spokes. As one example, the collapsible steering wheel thus may include a number of auxiliary spokes which for example corresponds to the number of spokes. Here one of the auxiliary spokes is assigned to each of the spokes, and each auxiliary spoke is suitably mounted at the end in articulated fashion on the assigned spoke. For example, the articulation of the auxiliary spoke on the respective spoke is spaced from the end of the respective spoke, in particular by at least one-third of the length of the respective spoke. For example, the articulation lies substantially in the middle of the spoke. The remaining free end of the respective auxiliary spoke is suitably mounted in articulated fashion on the second hub. The auxiliary spokes suitably extend only in one direction and for example are designed to be cuboid or similar. In particular, each of the spokes is produced by means of webs or similar. For example, the auxiliary spokes are made of one piece and hence are integral.

By means of the auxiliary spokes and the second hub, the individual spokes are connected together so they can be moved substantially only in synchrony with each other relative to the first hub. Here, suitably, the second hub is or can be stabilized relative to the first hub. Suitably, the second hub can be moved relative to the first hub by means of a first push-link chain. The first push-link chain, also called a push-link strap or push chain, has a number of chain links which in unloaded state can be pivoted relative to each other, for example can be rolled up. Suitably, each chain link of the push-link chain is attached to a respective adjacent chain link, such as the respective adjacent chain links, in each case by means of a bearing, so that in unloaded state, the individual chain links can be pivoted relative to each other.

When the first push-link chain is under load, the individual chain links cannot be moved relative to each other, so that compression forces or thrust forces can be transmitted by means of the first push-link chain. For this, the individual chain links suitably engage in corresponding openings and for example are locked together. In particular, this state of the first push-link chain exists when the first hub is spaced relative to the second hub. In particular, the first push-link chain is at least partially in the unloaded state when the distance of the second hub from the first hub is reduced. Because of the first push-link chain, the space required is reduced because the individual chain links in the first push-link chain can be rolled up or otherwise moved.

Suitably, the second hub may include a person protection device. In particular, the person protection device is an inflatable bag or may include at least one inflatable bag. The inflatable bag is inflated in the event of accident, for example by means of an explosive charge of the person protection device. In other words, the person protection device may be an airbag. Thus, the second hub serves both to stabilize the spokes and to protect the user of the motor vehicle. Suitably, in the correct usage state, no spokes or auxiliary spokes are arranged between the second hub and the user, which increases safety.

For example, each of the segments is configured to be rigid. However, each segment or at least one of the segments may include two sub-segments. In particular, the sub-segments are attached to each other in articulated fashion, suitably at the ends. This segments here may preferably be transferred into a V-shape by means of the articulation. In particular in the second position, the sub-segments of each segment are angled in a V-shape. In the first position, the segments are suitably arranged parallel to each other, or preferably an angle of substantially 180° is formed at least between these. Where the spokes are present, they are suitably spaced from the ends of the sub-segments which are attached to each other in articulated fashion. In other words, the articulation of the sub-segments on each other may be arranged between the individual spokes. Because of the sub-segments, it is possible to further reduce the space required for the steering wheel rim in collapsed state, in particular in the second position, which further increases comfort.

Suitably, the segments are locked in the first position. In this way, the segments are stabilized relative to each other in the first position, and can be transferred into the second position only by releasing the lock, so the second position cannot be assumed unintentionally. This increases safety. Alternatively, the segments could otherwise be secured and/or locked in the first position and/or the second position.

Suitably, the segments are each connected to each other rotatably at the ends. For this, one end of one of the segments is connected to a further end of one of the further segments or the further segment, and the segments can thus be twisted relative to each other. For example, a number of degrees of freedom are present, for example two degrees of freedom. As another example, only a single degree of freedom is present about which the segments can be twisted relative to each other. For example, connection takes place by means of a joint and by means of a second push-link chain. By means of the second push-link chain for example, any forces occurring are absorbed so that the segments are stabilized in the first and/or second position by means of the second push-link chain. This avoids an unintentional transfer of the collapsible steering wheel into the first or second position.

In one or more embodiments, the collapsible steering wheel may include three or four segments. Each segment thus corresponds substantially to an arc of 120° or 90°. Because of such a number of segments, in the second position a comparatively compact steering wheel rim is formed. Also, comparatively few individual components are required for this, which reduces complexity and hence production costs.

The steering device is part of a motor vehicle and in particular serves to set the direction of movement/travel of the motor vehicle. For this, the steering device is suitably coupled to the wheels of the motor vehicle. As one example, the steering device may include a toothed rack or is intended to be coupled to a toothed rack. In mounted state, the toothed rack is attached to at least one of the wheels of the motor vehicle, for example, two of the wheels, in particular the front wheels, so that on displacement of the rack through a specific range, a steering deflection of the wheels is changed. The steering device may include a steering column which in particular has a pinion that is actively connected to the toothed rack. The steering column is for example mounted so as to be rotatable at least in portions about a longitudinal axis. For example, a steering support device, in particular a so-called power steering unit, acts on the steering column when the steering device includes such power assistance. By means of the steering column, a collapsible steering wheel is mounted so as to be rotatable about the longitudinal axis.

The collapsible steering wheel has steering wheel rim with a number of segments which can be moved relative to each other between a first position and a second position. Here, in the first position a first angle, and in the second position a second angle, different from the first angle, is formed between respective adjacent segments. Suitably, the collapsible steering wheel may include a first hub which is surrounded by the segments. Here, the first hub may be attached to the steering column, for example rigidly or at least rotationally fixedly. Suitably, in the first position, substantially all segments are arranged in a plane which suitably lies perpendicularly to the longitudinal axis. For example, the collapsible steering wheel may include a second hub which is movable relative to the first hub in the longitudinal direction, i.e. parallel to the longitudinal axis. Suitably, the second hub is mounted on the first hub in articulated fashion by means of auxiliary spokes and spokes. In operation, the steering deflection of the wheels of the motor vehicle is set by rotation of the collapsible steering wheel about the longitudinal axis.

In one or more embodiments, the collapsible steering wheel is displaceable parallel to the longitudinal axis by means of a third push-link chain. In particular, the collapsible steering wheel is here mounted in displaceable fashion. Thus, it is possible to move the collapsible steering wheel away from the user along the longitudinal axis, in particular when the collapsible steering wheel is in the second position. In this way, additional space is created for the user of the motor vehicle, in particular the driver, which further increases comfort. Suitably, the third push-link chain is attached to the first hub (where present). In the first position, suitably the third push-link chain is under load, so that unintentional movement of the collapsible steering wheel away from the user is suppressed.

The refinements and advantages cited in connection with the steering wheel can be transferred accordingly to the steering device and vice versa.

BRIEF DESCRIPTION OF THE DRAWINGS

Exemplary embodiments of the invention are explained in more detail below with reference to a drawing. The drawing shows.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Mutually corresponding parts carry the same reference signs in all figures.

Figure 1:
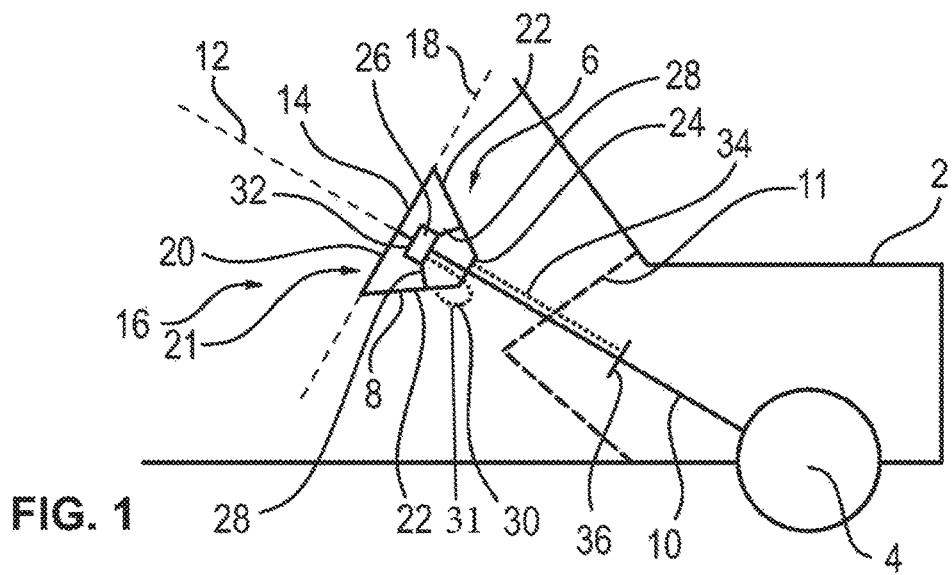
FIG. 1 diagrammatically, a motor vehicle with a steering device having a collapsible steering wheel which is in a first position, FIG. 2 the motor vehicle from FIG. 1, wherein the steering wheel is in a second position, FIG. 3 a refinement of the steering device, FIG. 4 in a top view, a further embodiment of the collapsible steering wheel in the first position, FIG. 5 in a side view, the collapsible steering wheel according to FIG. 4 in the first position, FIG. 6 corresponding to FIG. 4, the collapsible steering wheel in the second position, FIG. 7 corresponding to FIG. 5, the collapsible steering wheel in the second position, FIG. 8 in a further side view, the collapsible steering wheel in the second position, FIG. 9, 10 in perspective, a first hub and a second hub of the steering wheel which are joined together in articulated fashion by means of spokes and auxiliary spokes, and FIG. 11 in perspective, two segments of the steering wheel.

FIG. 1 shows a motor vehicle 2 with two front wheels 4, of which only one is shown. The motor vehicle 2 has a steering device 6 with a collapsible steering wheel 8 and a steering column 10 which protrudes through a dashboard 11. The collapsible steering wheel 8 is mounted by means of the steering column 10 so as to be rotatable about a longitudinal axis 12. On rotation of the collapsible steering wheel about the longitudinal axis 10, the steering column 10 is also rotated about the longitudinal axis 12. The steering column 10 is actively connected to a toothed rack (not shown), so that a rotational movement of the collapsible steering wheel 8 is converted into a translational movement of the toothed rack. The toothed rack itself is actively connected to the front wheels 4, and a steering deflection of the front wheels 4 is set by movement of the toothed rack in the transverse direction, so that a movement direction of the motor vehicle 2 is changed.

The collapsible steering wheel 8 has a steering wheel rim 14 which is in a first position 16 shown in FIG. 1. Here, the steering wheel rim 14 is arranged substantially in a plane 18 which is perpendicular to the longitudinal axis 12. In the first position 16, the steering wheel rim 14 is designed to be substantially circular and has three segments 20, each of which forms an arc of substantially 120°. Between adjacent segments 20, a first angle 21 of 180° is formed. Each of the segments 20 is mounted in articulated fashion by means of two spokes 22 on a first hub 24, which is offset relative to the steering wheel rim 14 along the longitudinal axis 12 in the direction of the front wheels 4. One end of each of the segments 20 is mounted in articulated fashion on two of the three spokes 22. In other words, each segment is mounted at both ends in articulated fashion on one of the spokes 22, so that in each case two of the segments 20 are assigned to each spoke 22. The segments 20 surround the first hub 24 on the circumference, i.e. perpendicularly to the longitudinal axis 12.

A second hub 26 is positioned between the first hub 24 and the steering wheel rim 14 in the direction of the longitudinal axis 12, and is mounted on the spokes 22 in articulated fashion by means of three auxiliary spokes 28. Each of the auxiliary spokes 28 is mounted at the ends in articulated fashion on the second hub 26 and substantially centrally on one of the spokes 22, so that one of the auxiliary spokes 28 is assigned to each spoke 22. The second hub 26 can be moved in a longitudinal direction, i.e. parallel to the longitudinal axis 12, relative to the first hub 24. The distance of the second hub 26 from the first hub 24 is set by means of a first push-link chain 30, which is attached at the end to the second hub 26 and held variably on the first hub 24. The first push-link chain 30 has a number of individual chain links 31 which, when not under load, can be pivoted relative to each other through a specific region. When under load, the chain links are locked so that they can transmit a compression and/or tension load. Between the first hub 24 and second hub 26, the first push-link chain 30 is under load so that the distance between the two hubs 24, 26 is fixed because of the transmission of compression and tension by the first push-link chain 30. The further region of the first push-link chain 30 is not under load and is rolled up into a container (not shown in detail).

The second hub 26 may include a person protection device 32 which is concealed under a cover (not shown in detail). The person protection device 32 may include an inflatable bag which is deployed by triggering an explosive device in the event of an impact of the motor vehicle 2 on an obstacle above a specific speed, so that the inflatable bag is inflated. By means of the inflatable bag, the head of the driver of the motor vehicle 2 is prevented from hitting the steering wheel rim 14.

Furthermore, a third push-link chain 34 is fixedly connected to the first hub 24 and runs parallel to the steering column 10 through the dashboard 11 up to a stop 36. By means of the third push-link chain 34, the position of the first hub 24 relative to the stop 36 is predefined and stabilized.

Figure 2:
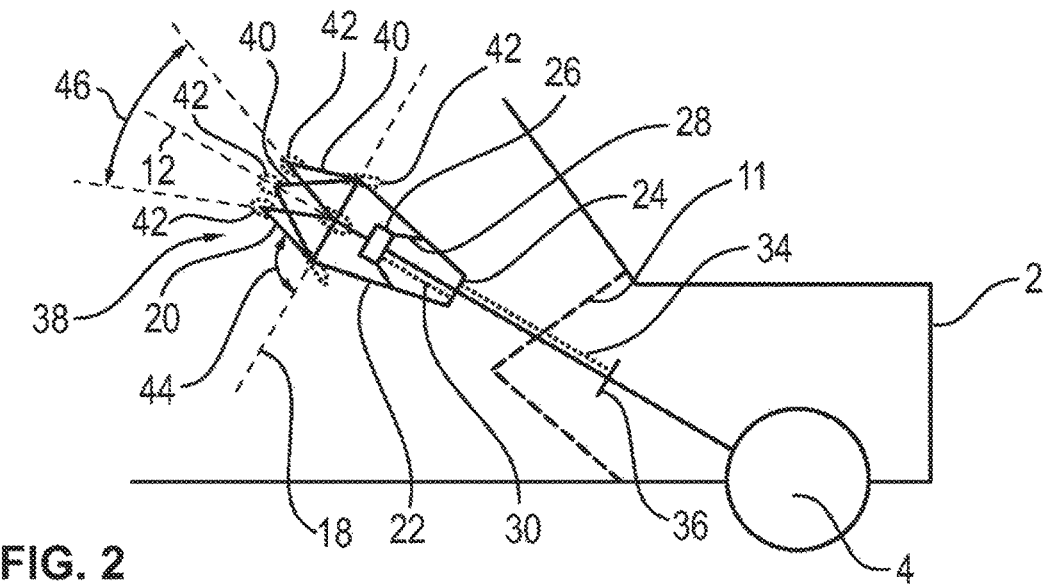

The collapsible steering wheel 8 is collapsible in a second position 38 shown in FIG. 2. For this, the distance of the second hub 26 from the first hub 24 is increased by means of the first push-link chain 30. Accordingly, the spokes 22 and the auxiliary spokes 28 are moved towards each other. The individual segments 20, which are locked together in the first position 16, are twisted relative to each other. Each of the segments 20 has two sub-segments 40 which are connected together at the ends. The sub-segments 40 are arranged in a V-shape on transfer to the second position 38 by means of the second push-link chain 42. In other words, the two sub-segments of each segment 20 are mounted on each other at the ends in articulated fashion so as to be foldable, wherein the adjustment angle thereof is set by means of the second push-link chain 42. In the first position 16 however, the sub-segments 40 are arranged in the plane 18 and an angle of 180° is formed between the sub-segments 40.

The individual segments 20 are each connected together at the ends so as to be rotatable by means of the second push-link chain 42, wherein a second push-link chain 42 is assigned to each transition between the individual segments 20. Accordingly, each of the segments 20 at the end encloses a third angle 44 with the plane 18, wherein the plane 18 are defined in particular by means of those ends of the ends of the spokes 22 spaced from the first hub 24. However, at least the plane 18 is perpendicular to the longitudinal axis 12. Thus, the respective adjacent segments 20 also enclose a second angle 46 with each other, which corresponds substantially to 90° less the third angle 44. In comparison with this, in the first position 16 shown in FIG. 1, respective adjacent segments 20 enclose the first angle 21 which is 180°. In other words, in the first position 16, the steering wheel rim 14 has a round, for example circular, or polygonal appearance, wherein for example the corners are rounded. In the second position 38, the position of the segments 20 relative to each other is changed. Thus, in the second position 38, the collapsible steering wheel 8 is folded up, and the extension of the collapsible steering wheel perpendicularly to the longitudinal axis 12 is reduced, so that the user has a larger movement space.

Figure 3:
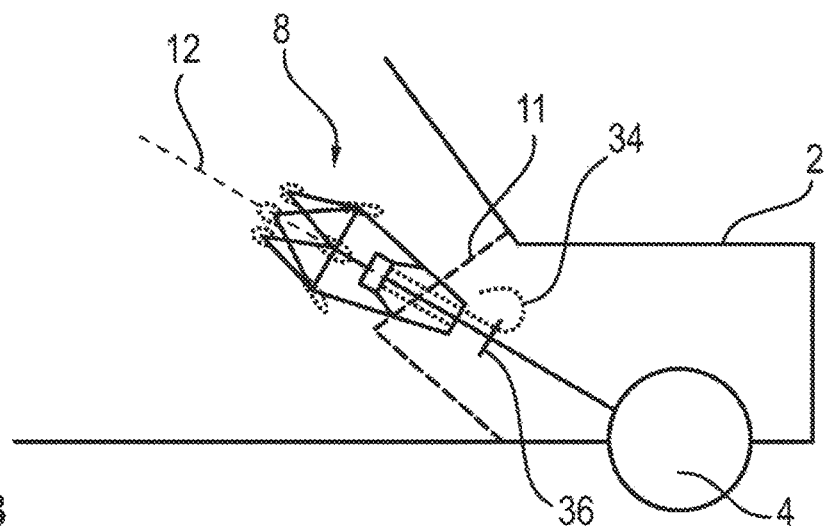

In addition, the steering wheel 8 is moved by means of the third push-link chain 24 at least partially parallel to the longitudinal axis 12 in the direction of the dashboard 11 by means of the third push-link chain 24. Here, the collapsible steering wheel 8 is stowed at least partially inside the dashboard 11. For this, the length of the third push-link chain 24 is reduced so that this protrudes at least partially beyond the stop 36. The protruding region of the third push-link chain 24 is rolled up so that the space required is smaller. Because the collapsible steering wheel 8 is at least partially retracted into the dashboard 11, there is further freedom of movement for the user of the motor vehicle 2. For example, the collapsible steering wheel 8 is transferred into the position shown in FIG. 3 for entry and/or exit. Also, if the motor vehicle is to be moved autonomously, in particular in Level 3 or above, the steering wheel is transferred at least into the second position 38 or into the position shown in FIG. 3. In a variant (not shown in more detail), the third push-link chain 24 is omitted and the collapsible steering wheel cannot be moved relative to the dashboard 11, or can only be moved to a comparatively small extent.

Figure 4:
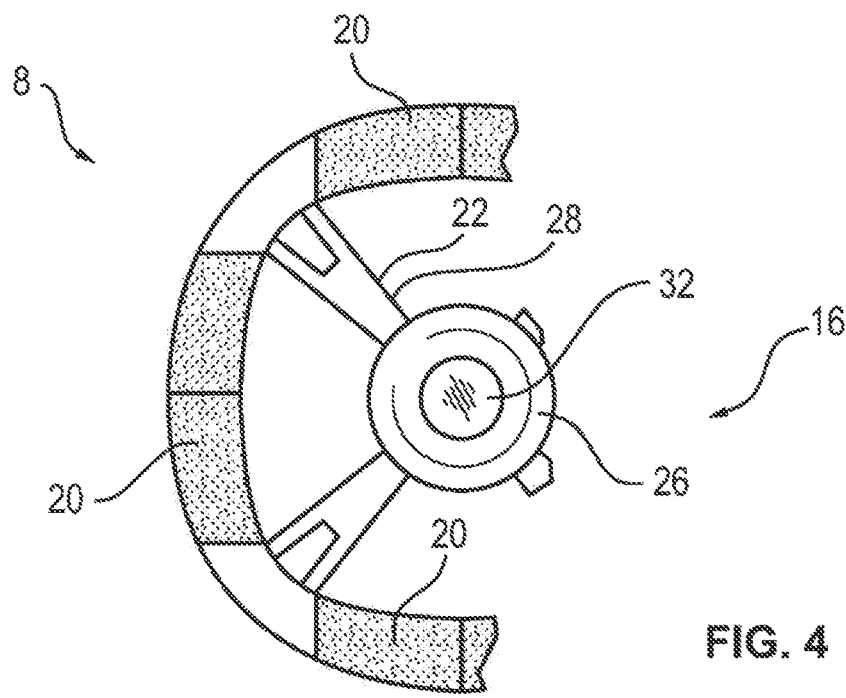
Figure 5:
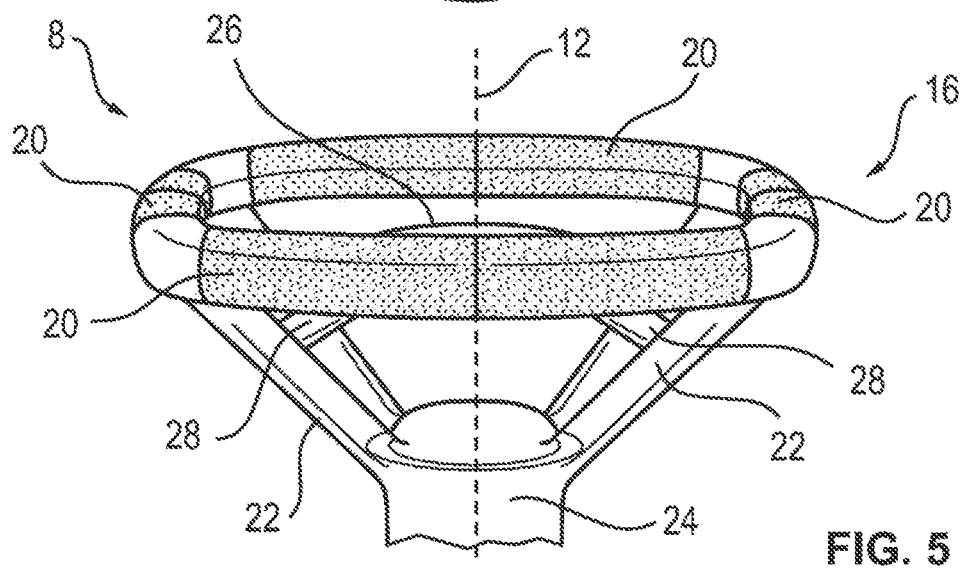

FIG. 4 shows in a top view, and FIG. 5 in a side view, a further embodiment of the collapsible steering wheel 8 in the first position 16. This has four segments 20 which are arranged in a substantially rectangular form with flattened corners. The collapsible steering wheel 8 furthermore has four spokes 22 which are mounted in articulated fashion on the first hub 24 and on one of the ends of two of the segments 20. The segments 20 again surround the first hub 24 on the circumference. Also, this collapsible steering wheel 8 may include the second hub 26 which is displaceable parallel to the longitudinal axis 12, relative to the first hub 24, and mounted in articulated fashion on the spokes by means of the auxiliary spokes 28. The collapsible steering wheel 8 has four such auxiliary spokes 28 which are each mounted in the end region in articulated fashion on the second hub 26 and substantially centrally on the respective assigned spoke 22.

Figure 6:
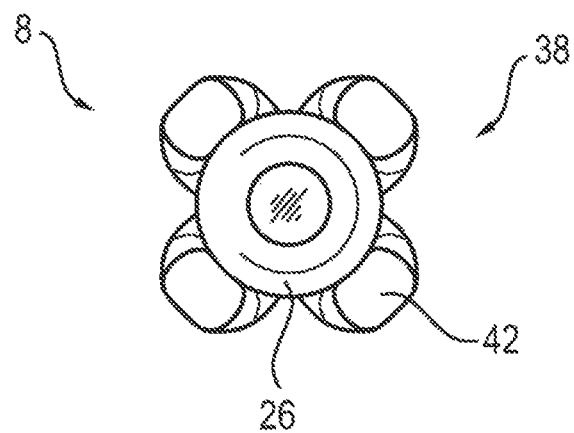
Figure 7:
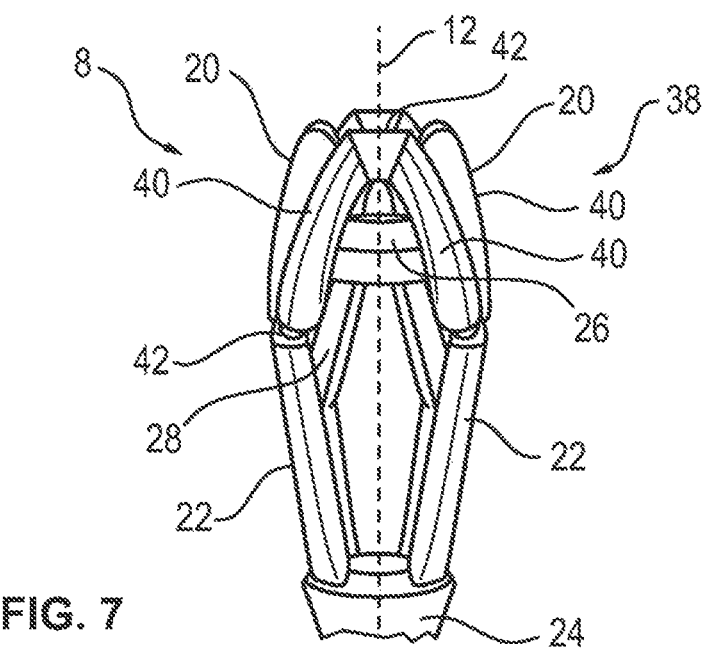
Figure 8:
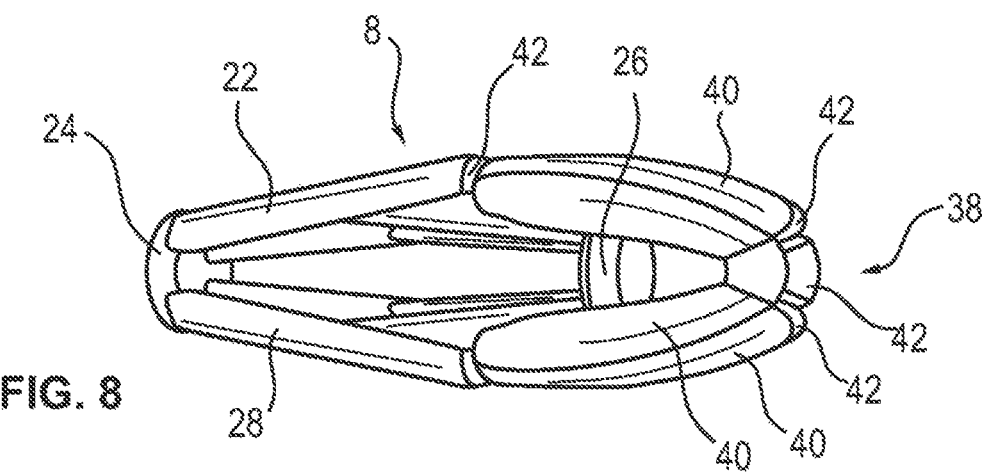

FIGS. 6 to 8 show, in top view and in side view, the collapsible steering wheel 8 in the second position 38. In the second position 38, the distance of the second hub 26 from the first hub 24 is increased, for which reason the spokes 22 have been pivoted in the direction of the longitudinal axis 12 because of the auxiliary spokes 28. Each of the segments 20, which were locked together in the first position 16, is formed in a V-shape because of the sub-segments 40 which are attached to each other at the ends. The remaining ends of the sub-segments 40, and hence the free ends of each of the segments 20, are attached to a respective one of the spokes 22, and between the respective adjacent segments 20 a second angle 46 is formed which is less than 45°. In the second position 38, the segments 20 lie on the second hub 26, for which reason the collapsible steering wheel 8 has a substantially cigar-like shape. In the first position 16, the shape is however that of a truncated cone. To summarize, in the second position 38 the sub-segments 42 are folded towards each other, and the ends of the segments 20, which are connected rotatably together at the ends by means of one of the second push-link chains 42, are moved towards each other.

Figure 9:
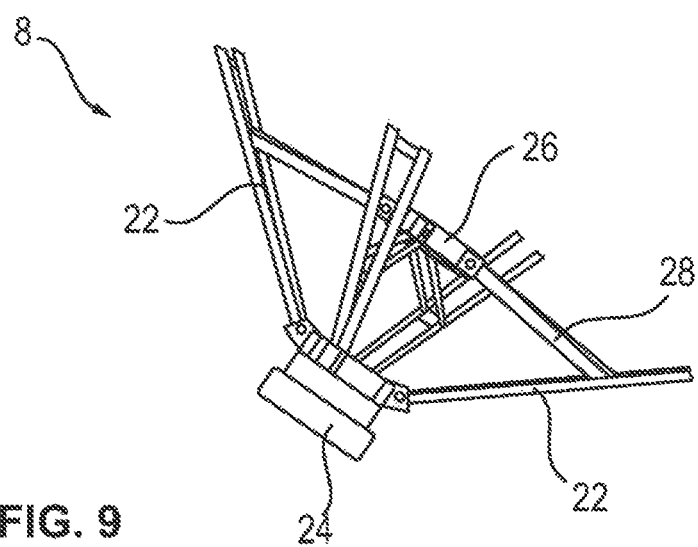
Figure 10:
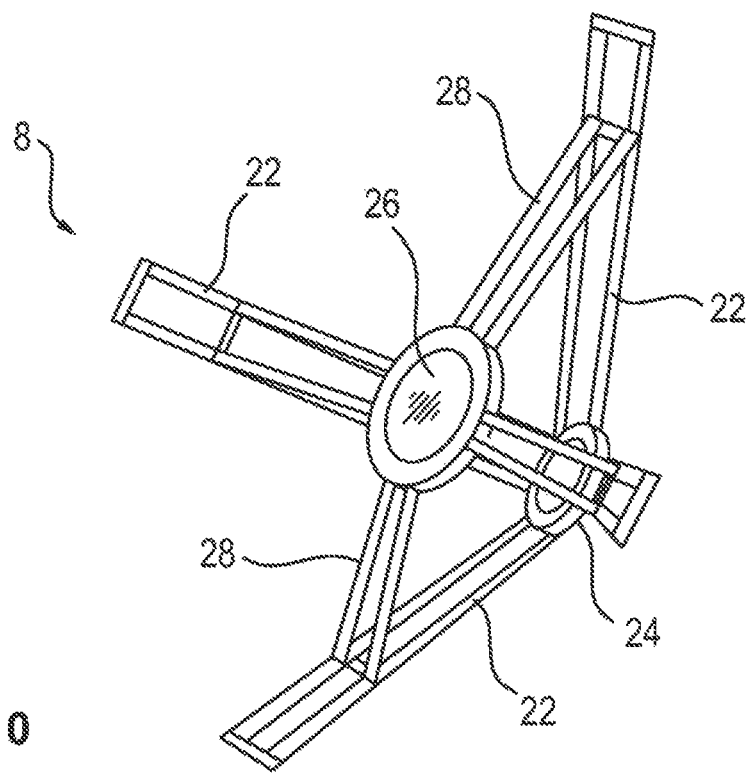

FIG. 9 and FIG. 10 again show the collapsible steering wheel 8 in the first position 16 with the steering wheel rim 14 omitted. In this embodiment, the webs 22 and the auxiliary webs 28 are formed by means of rods, so that they comprise openings. Accordingly, the weight is further reduced. Articulation takes place by means of plain bearings, and the auxiliary webs 28 are attached to the webs 22 in the upper third, offset away from the first hub 24, of the substantially rectilinear webs 22.

Figure 11:
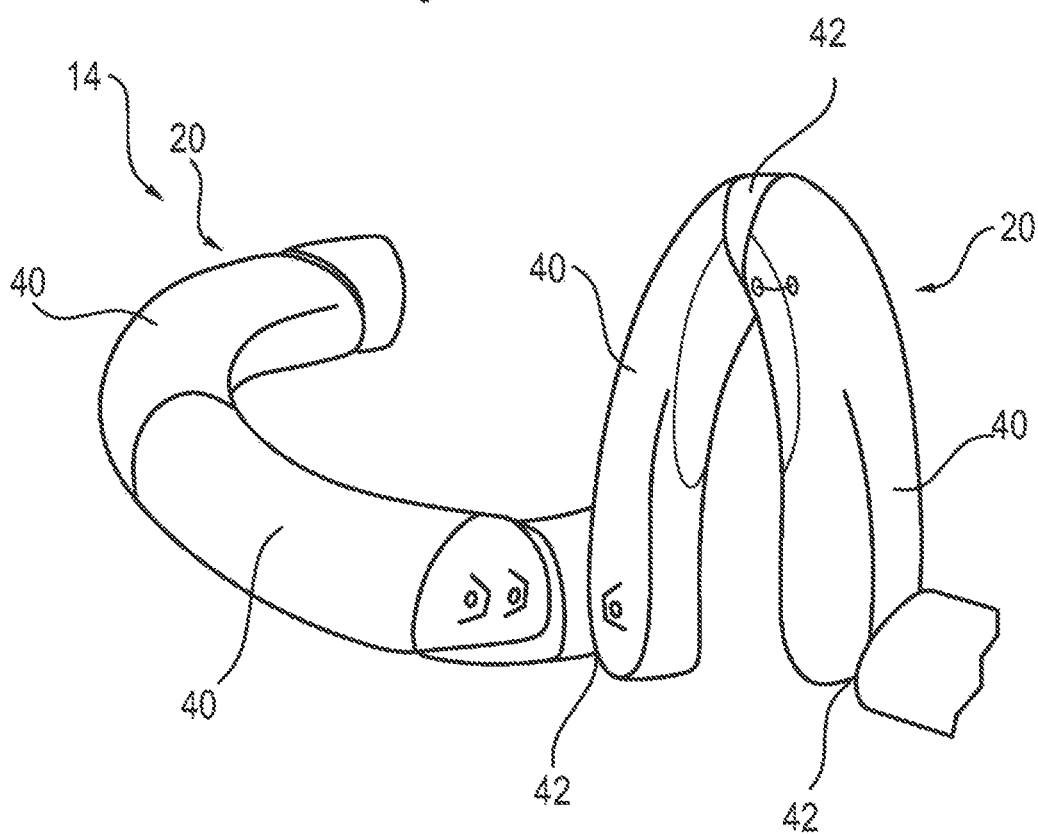

FIG. 11 shows various configurations of the steering wheel rim 14 in extract. The respective configuration is predefined by means of the spokes 22 and the auxiliary spokes 28. Each of the segments 20 has the two sub-segments 40, which are joined together at the ends by means of the second push-link chain 42 and mounted on each other in articulated fashion so as to be foldable. Thus, by means of the two sub-segments 40, either a quarter circle or a portion of the rectangular form or a V-shape can be formed. The segments 20 themselves are connected together rotatably at the ends by means of the second push-link chain 42, so that the segments 20 can be moved substantially freely relative to each other. By means of the webs 22 and the auxiliary webs 28 however, uncontrolled movement of the segments 20 relative to each other is avoided.

To summarize, the collapsible steering wheel 8 is designed to be foldable, and the steering wheel rim 14 has several segments 20 and consists of these for example. The segments 20 are connected together in rotatable fashion. In the unfolded state, i.e. in the first position 16, the segments 20 lock in each other to form the substantially round configuration, shown for example in FIG. 4. The second hub 26 and hence the person protection device 32 is framed by the segments 20. By means of the spokes 22 and the auxiliary spokes 28, a folding mechanism is provided which serves to collapse the individual segments 20 and sub-segments 40. Here either three or four segments 20 are present, wherein the number of spokes 22 corresponds to the number of segments 20. Also, the foldable steering wheel 8 is adjustable relative to the dashboard 11 and may thus be extended and retracted, for which the third push-link chain 24 in particular is used.

Because of the collapsible steering wheel 8, a space saving is achieved, wherein the collapsible steering wheel 8 is transferred into the second position 38 when not in use, in particular when the motor vehicle 2 is travelling autonomously or when the motor vehicle is at a standstill, for example parked. In other words, the collapsible steering wheel 8 is in the second position 38 if there is no need to influence a direction of movement (travel) of the motor vehicle 2. Because of the additional movement of the collapsible steering wheel 8 in the direction of the dashboard 11, more space is created for the user of the motor vehicle 2. An aesthetic appearance is also improved.

The invention is not restricted to the exemplary embodiments described above. Rather, other variants of the invention may be derived by the person skilled in the art, without leaving the subject of the invention. In particular, furthermore, all individual features described in connection with the individual exemplary embodiments may be combined with each other in different ways, without leaving the subject of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Motor vehicle
4 Front wheel
6 Steering device
8 Collapsible steering wheel
10 Steering column
11 Dashboard
12 Longitudinal axis
14 Steering wheel rim
16 First position
18 Plane
20 Segment
21 First angle
22 Spoke
24 First hub
26 Second hub
28 Auxiliary spoke
30 First push-link chain
32 Person protection device
34 Third push-link chain
36 Stop
38 Second position
40 Sub-segment
42 Second push-link chain
44 Third angle
46 Second angle

The invention claimed is:

1. A collapsible steering wheel for use in a motor vehicle, the collapsible steering wheel comprising:
a steering wheel rim having a number of segments configured to move relative to each other between a first position and a second position, wherein in the first position a first angle is formed between respective adjacent segments and in the second position, a second angle, different than the first angle, is formed between the respective adjacent segments and wherein each segment has two sub-segments mounted to each other end to end so that the two sub-segments are foldable.

2. The collapsible steering wheel of claim 1, wherein the motor vehicle includes a steering column defining a longitudinal axis, wherein in the first position, the segments are arranged substantially in a plane orthogonal to the longitudinal axis, and in the second position, at least one of the segments forms a third angle with respect to the plane.

3. The collapsible steering wheel of claim 1, further comprising: a first hub surrounded by and attached to the segments.

4. The collapsible steering wheel of claim 3, further comprising: a number of spokes each mounted to the first hub and configured to articulate with respect to the first hub.

5. The collapsible steering wheel of claim 4, wherein each segment is mounted to one of the spokes and configured to articulate with respect thereto.

6. The collapsible steering wheel of claim 4, further comprising: a second hub movable in a longitudinal direction relative to the first hub.

7. The collapsible steering wheel of claim 6, further comprising a first push-link chain and an auxiliary spoke, extending between the second hub and one of the spokes, wherein the second hub moves in the longitudinal direction as the first push-link chain moves and the auxiliary spoke articulates with respect to one or more spokes of the number of spokes.

8. The collapsible steering wheel of claim 7, wherein ends of each of the segments are rotatably connected to each other at the ends by a second push-link chain.

9. The collapsible steering wheel of claim 6, further comprising a person protection device disposed in the second hub.

10. The collapsible steering wheel of claim 1, wherein the segments are configured to lock in the first position.

11. A steering device for use in a motor vehicle, the steering device comprising:
a steering column defining a longitudinal axis;
a collapsible steering wheel configured to rotate about the longitudinal axis and including,
a steering wheel rim having a number of segments configured to move relative to each other between a first position and a second position, wherein in the first position a first angle is formed between respective adjacent segments and in the second position a second angle, different than the first angle, is formed between the respective adjacent segments; and
a push-link chain coupled to the collapsible steering wheel and configured to actuate to move the collapsible steering wheel in a direction parallel to the longitudinal axis.

12. A collapsible steering wheel configured to move between a first position and a second position, the collapsible steering wheel comprising:
a first hub;
a first spoke and a second spoke each extending from the first hub and configured to articulate with respect to the first hub;
a first segment, extending from the first spoke and configured to articulate with respect to the first spoke, and a second segment extending from the second spoke and configured to articulate with respect to the second spoke, wherein the first segment includes a first sub-segment and a second sub-segment, wherein ends of the first sub-segment and the second sub-segment are coupled to one another and foldable with respect to one another;
a second hub aligned with the first hub along a longitudinal axis, wherein as the collapsible steering wheel moves from the first position to the second position, the first and second spokes and the first and second segments move towards the longitudinal axis; and
a first push-link chain extending between the first hub and the second hub and having a number of chain links.

13. The collapsible steering wheel of claim 12, further comprising an auxiliary spoke extending between the first spoke and the second hub, wherein the auxiliary spoke is configured to translate along the first spoke as the collapsible steering wheel moves from the first position to the second position.

14. The collapsible steering wheel of claim 13, wherein as the collapsible steering wheel moves from the first position to the second position, the second hub moves along the longitudinal axis away from the first hub.

15. The collapsible steering wheel of claim 12, wherein when the collapsible steering wheel is in the first position, the first segment and the longitudinal axis define a first angle, and when the collapsible steering wheel is in the second position, the first segment and the longitudinal axis define a second angle, greater than the first angle.

16. The collapsible steering wheel of claim 12, wherein the number of chain links are configured to lock to one another in response to applying a load to the first push-link chain.

17. The collapsible steering wheel of claim 16, wherein a distance between the first hub and the second hub is fixed when the number of chain links are locked to one another.

18. The collapsible steering wheel of claim 12, further comprising:
   a steering column provided with a stop; and
   a second push-link chain extending between the first hub and the stop and configured to adjust a position of the first hub relative to the stop.

* * * * *